United States Patent
Orlov

(10) Patent No.: US 10,689,088 B2
(45) Date of Patent: Jun. 23, 2020

(54) EXTENDED REAR PRESSURE BULKHEAD

(71) Applicant: Airbus Operations GmbH, Hamburg (DE)

(72) Inventor: Dimitri Orlov, Tornesch (DE)

(73) Assignee: Airbus Operations GmbH (DE)

( * ) Notice: Subject to any disclaimer, the term of this patent is extended or adjusted under 35 U.S.C. 154(b) by 987 days.

(21) Appl. No.: 15/058,524

(22) Filed: Mar. 2, 2016

(65) Prior Publication Data

US 2016/0257392 A1  Sep. 8, 2016

(30) Foreign Application Priority Data

Mar. 6, 2015 (EP) ..................................... 15158047

(51) Int. Cl.
*B64C 1/10* (2006.01)

(52) U.S. Cl.
CPC ..................... *B64C 1/10* (2013.01)

(58) Field of Classification Search
CPC .. B64C 1/10; B64C 1/069; B63B 3/34; B63B 3/26; B63B 3/14
See application file for complete search history.

(56) References Cited

U.S. PATENT DOCUMENTS

| | | | |
|---|---|---|---|
| 4,712,751 A | 12/1987 | Hirschel | |
| 5,062,589 A | 11/1991 | Roth et al. | |
| 5,778,813 A * | 7/1998 | Kennedy | B32B 15/06 114/74 A |
| 5,934,616 A | 8/1999 | Reimers et al. | |
| 6,378,805 B1 * | 4/2002 | Stephan | B64C 1/10 244/117 R |
| 8,033,503 B2 * | 10/2011 | Basso | B64C 1/10 244/119 |
| 8,444,089 B2 * | 5/2013 | Mischereit | B64C 1/10 244/118.5 |
| 8,596,578 B2 | 12/2013 | Noebel et al. | |
| 8,939,404 B2 | 1/2015 | Sayilgan et al. | |
| 2008/0179459 A1 * | 7/2008 | Garcia Laja | B64C 1/10 244/119 |
| 2009/0137196 A1 | 5/2009 | Klug et al. | |
| 2010/0243806 A1 * | 9/2010 | Vera Villares | B64C 1/10 244/119 |
| 2011/0179626 A1 * | 7/2011 | Weber | B21J 15/14 29/428 |
| 2011/0233334 A1 * | 9/2011 | Stephan | B64C 1/10 244/119 |

(Continued)

OTHER PUBLICATIONS

Wikipedia, "Parallel curve"; https://en.wikipedia.org/wiki/Parallel_curve; accessed Nov. 5, 2018 (Year: 2018).*

*Primary Examiner* — Joseph W Sanderson

(74) *Attorney, Agent, or Firm* — Lerner, David, Littenberg, Krumholz & Mentlik, LLP

(57) ABSTRACT

A fuselage includes a fuselage section with an inner surface having a non-circular contour and a spherical pressure bulkhead with an outer edge. The outer edge of the spherical pressure bulkhead is attached to the inner surface of the fuselage section and extends along a line, which is non-circular. The line extends in a three-dimensional space extending parallel to the inner surface of the fuselage section. An aircraft and a method for manufacturing a fuselage are also described.

14 Claims, 3 Drawing Sheets

(56) References Cited

U.S. PATENT DOCUMENTS

| | | | |
|---|---|---|---|
| 2012/0186062 A1* | 7/2012 | Vera Villares | B64C 1/069 29/428 |
| 2013/0099053 A1 | 4/2013 | Barmichev et al. | |
| 2013/0266770 A1* | 10/2013 | Otto | B32B 37/1284 428/172 |
| 2014/0054419 A1* | 2/2014 | Grase | B64C 1/10 244/121 |
| 2014/0370227 A1* | 12/2014 | Diep | B64D 45/00 428/66.4 |
| 2016/0257393 A1* | 9/2016 | Orlov | B64C 1/10 |

* cited by examiner

EXTENDED REAR PRESSURE BULKHEAD

FIELD OF THE INVENTION

The invention generally relates the manufacturing of fuselages for vehicles. In particular, the invention relates to a fuselage, an aircraft comprising a fuselage and a method for manufacturing a fuselage.

BACKGROUND OF THE INVENTION

In modern aircraft, pressurized cabin areas are separated from non-pressurized cabin areas by means of so-called pressure bulkheads. The pressure bulkhead comprises a spherical shape in order to effectively transmit pressure loads which are due to the pressure difference between the pressurized cabin area and the non-pressurized outer area of the aircraft. The integration of such a pressure bulkhead requires also an installation of several attachment parts by which the pressure bulkhead is attached to the fuselage of the aircraft. Therefore, several parts are required which are necessary to provide the required stability for transmitting the pressure loads into the primary structure of the aircraft, e.g. the fuselage. Furthermore, since the fuselage section has a non-circular shape and the pressure bulkhead has a spherical shape, the gap between the pressure bulkhead and the non-circular fuselage section has to be closed by special formed parts.

U.S. Pat. No. 8,596,578 B2 describes a pressure bulkhead for a fuselage of an aircraft which is configured for bounding a fuselage interior relative to an external environment. The pressure bulkhead includes a flat skin configured to span a cross-section of the fuselage and having a cavity disposed at a core region of the skin. The core region is radially bounded by a ring element.

U.S. Pat. No. 8,939,404 B2 describes a pressure fuselage of an aircraft, which fuselage in longitudinal direction comprises several fuselage sections, wherein at least one rear dome-shaped pressure bulkhead is provided to form an aircraft-internal pressurized region, with a ring-shaped frame element profile being provided for radially outward attachment of said dome-shaped pressure bulkhead to at least one fuselage section.

BRIEF SUMMARY OF THE INVENTION

An aspect of the present invention may reduce the number of required parts for manufacturing a fuselage section.

According to an aspect of the present invention, a fuselage is provided. The fuselage comprises a fuselage section with an inner surface having a non-circular contour and a pressure bulkhead, e.g. a spherical pressure bulkhead, with an outer edge. The outer edge of the spherical pressure bulkhead is attached to the inner surface of the fuselage section and extends along a line, which is non-circular. The line extends in a three-dimensional space, extending parallel to the inner surface of the fuselage section. The line may also be called non-circular line in the following.

The outer edge may limit the (spherical) extension of the pressure bulkhead. In other words, the pressure bulkhead may have a completely spherical shape which is limited by the outer edge. Therein, the outer edge may be non-circular in a cross sectional view since the outer edge extends along the line which itself is non-circular. For example, the line extends parallel to the outer edge of the pressure bulkhead. However, the line may also be a line defining the outer edge of the pressure bulkhead. Therefore, the line and/or the outer edge of the pressure bulkhead may extend at a constant distance to the inner surface of the fuselage section. The line may be parallel to a virtual intersection line which will be described in the following.

In other words, the spherical pressure bulkhead is attached to the inner surface of the fuselage section along or parallel to the intersection line of a spherical surface having a region which corresponds to or lies in an inner surface of the spherical pressure bulkhead and a second surface having a region which corresponds to or lies in the inner surface of the fuselage section. It is possible that the line along which the non-circular outer edge of the pressure bulkhead extends is the intersection line, in particular if there is no distance between the outer edge of the pressure bulkhead and the inner surface of the fuselage section. However, there may be a constant distance between the outer edge of the pressure bulkhead and the inner surface of the fuselage section and therefore also between the non-circular line and the virtual intersection line.

In this manner, the pressure bulkhead may be adapted in its shape such that the pressure bulkhead fits into the fuselage section which, in a cross-sectional view, has a non-circular contour. In particular, the inner surface of the fuselage section has a non-circular contour in a cross-sectional view, e.g. when looking into a longitudinal direction of the fuselage or fuselage section. The pressure bulkhead may be in direct contact to the inner surface of the fuselage section. However, it may also be possible that the pressure bulkhead is attached to the inner surface of the fuselage section while providing a certain distance between the inner surface of the fuselage section and an outer edge of the pressure bulkhead. The virtual intersection line may be defined as a line or curve which extends on the inner surface of the fuselage section and which is generated by intersecting an extended surface of the pressure bulkhead with the inner surface of the fuselage section. In other words, the intersection line is provided by an intersection of a spherical surface which may also be a virtual surface and the inner surface of the fuselage section. A part of this spherical surface may define an inner surface of the spherical pressure bulkhead. Analogously, the part of the second surface may be defined by the inner surface of the fuselage section. The inner surface of the fuselage section may be an inner surface of a skin of the fuselage section, for example of an outer skin of an aircraft.

The virtual intersection line may be imagined as a line which is generated by extending the inner surface of the spherical pressure bulkhead beyond an outer edge of the spherical pressure bulkhead such that the extension of the inner surface of the spherical pressure bulkhead intersects the inner surface of the fuselage section at the intersection line. Therein, both inner surface of the spherical pressure bulkhead and the extension of the inner surface of the pressure bulkhead may comprise a spherical form or shape. The intersection line as well as the spherical surface and the second surface may be virtual geometrical parts which help to describe the arrangement of the pressure bulkhead with respect to the fuselage section. The pressure bulkhead may be directly attached to the fuselage section at the intersection line. It may also be possible that the pressure bulkhead may be attached to the fuselage section, e.g. to the inner surface of the fuselage section by means of an attachment unit. However, the attachment of the pressure bulkhead is located at the non-circular line or at the virtual intersection line, which itself is defined as an intersection line between the virtually extended inner surface of the spherical pressure bulkhead and the inner surface of the fuselage section. The pressure bulkhead which is attached to the inner surface of the fuselage section along the non-circular line or the virtual intersection line may have a completely spherical shape. However, in a cross-sectional view or in a front view of the fuselage section, the pressure bulkhead may have a non-circular outer edge which follows or extends parallel to the non-circular contour of the inner surface of the fuselage section. This aspect will be explained in more detail in the description of the figures.

The fuselage may be a vehicle fuselage. In particular, the fuselage may be an aircraft fuselage, wherein the pressure bulkhead which is comprised by the fuselage may separate a cabin area of the aircraft from an outer area of the aircraft. The pressure bulkhead may be stiffened by stiffening units such that pressure loads acting on the pressure bulkhead is transferable through the pressure bulkhead and then into the fuselage section. The pressure bulkhead may be adapted to transmit pressure loads acting on a surface of the pressure bulkhead into the fuselage structure.

The spherical pressure bulkhead may extend to the inner surface of the fuselage section such that no additional parts are necessary to close a gap between the outer edge of the pressure bulkhead and the inner surface of the fuselage section. However, it may also be possible that a small gap between the outer edge of the pressure bulkhead, e.g. the non-circular line, and the inner surface of the fuselage section occurs, wherein the gap extends along the intersection line and wherein the gap has a constant thickness. In other words, the gap may be defined by a distance between the outer edge of the pressure bulkhead or the non-circular line and the inner surface of the fuselage section, which distance is constant along the intersection line. The distance may be measured in a perpendicular direction to the inner surface of the fuselage section or to a longitudinal axis of the fuselage section. Therefore, the outer edge of the pressure bulkhead may be defined by the non-circular line which extends parallel to the virtual intersection line. This means that the line defining the outer edge of the pressure bulkhead and the virtual intersection line are parallel lines or curves which may have a substantially constant offset. However, the intersection line may extend on the inner surface of the fuselage section and/or the outer edge of the pressure bulkhead may extend along the virtual intersection line at a predetermined offset which is constant along the intersection line.

Furthermore, the non-circular line is a three-dimensional curve extending parallel to the inner surface of the fuselage section. The non-circular line representing the outer edge of the pressure bulkhead is a three-dimensional curve since the pressure bulkhead which may have a completely spherical shape extends to the outer edge which itself is non-circular. A spherical body which extends to its outer edge such that the outer edge is non-circular in a cross sectional view may only describe a line or curve which is three-dimensional. Hence, it is not possible that the non-circular line only extends in a virtual plane, like a two-dimensional line for example. This means that at certain locations the non-circular line is deflected from the virtual plane which is perpendicular to the longitudinal axis of the fuselage section. In other words, the non-circular line comprises a component which is deflected from the virtual plane into the longitudinal direction of the fuselage section. The non-circular line may extend parallel or on the inner surface of the fuselage section.

Moreover, the virtual intersection line may also extend in a three-dimensional space because it is defined by an intersection between a spherical element, e.g. the spherical pressure bulkhead, and a longitudinal fuselage section which may have an inner surface with a non-circular contour in a cross-sectional view. For example, the fuselage section is a longitudinally extended body and the pressure bulkhead is a spherical body, both bodies being arranged such that the inner surface of the fuselage section and an extended virtual surface of the pressure bulkhead intersect at the intersection line. Therefore, the intersection line may be a line or curve extending in a three-dimensional space.

According to another embodiment of the invention, a distance between the outer edge of the pressure bulkhead and the inner surface of the fuselage section is constant.

In other words, the non-circular outer edge, e.g. the non-circular line, is aligned with the non-circular contour of the inner surface of the fuselage section and/or the virtual intersection line. The outer edge of the pressure bulkhead may therefore have a constant distance to the inner surface of the fuselage section wherein the constant distance may be measured between the virtual intersection line and the outer edge of the pressure bulkhead perpendicular to the longitudinal axis of the fuselage section. The outer edge of the pressure bulkhead may define a curve, e.g. the non-circular line which extends along the intersection line in a parallel manner. In other words, the line defining the outer edge of the pressure bulkhead and the intersection line are parallel curves having a substantially constant predetermined offset or distance. Therein, the virtual intersection line extends on the inner surface of the fuselage section. However, it may also be possible that the outer edge of the pressure bulkhead, e.g. the line defining the outer edge of the pressure bulkhead, is in direct contact to the inner surface of the fuselage section and/or the second non-circular edge. It should be mentioned that the pressure bulkhead may be manufactured as one piece.

According to another embodiment of the invention, the line forms a closed curve which encloses a longitudinal axis of the fuselage section.

In other words, the non-circular line may be a curve extending in a three-dimensional space and extending around the longitudinal axis of the fuselage section. Moreover, the non-circular line may extend on or parallel to the inner surface of the fuselage section. The inner surface of the fuselage section may be defined by an extruded curve wherein the curve may be extruded along the longitudinal axis of the fuselage section and wherein the extruded curve may provide a surface defining the inner surface of the fuselage section. The extruded curve may be a closed curve enclosing the longitudinal axis of the fuselage section, thereby forming a so called loft when the curve becomes extruded.

Furthermore, the virtual intersection line which may be a curve extending in a three-dimensional space and extending around the longitudinal axis of the fuselage section. Moreover, the intersection line may extend on the inner surface of the fuselage section. However, the virtual intersection line may be generated by an intersection between a spherically curved surface, e.g. the virtually extended spherical inner surface of the pressure bulkhead and the inner surface of the fuselage section. The inner surface of the fuselage section may be defined by an extruded curve wherein the curve may be extruded along the longitudinal axis of the fuselage section and wherein the extruded curve may provide a surface defining the inner surface of the fuselage section. The extruded curve may be a closed curve enclosing the longitudinal axis of the fuselage section, thereby forming a so called loft when the curve becomes extruded.

According to another embodiment of the invention, the pressure bulkhead forms a barrier between a pressurized cabin area and a non-pressurized outer area of the fuselage section.

In particular, the pressure bulkhead may be a rear pressure bulkhead in a fuselage section of an aircraft which separates the pressurized cabin area and the non-pressurized outer area of the fuselage section, for example during flight. Therefore, it is possible that the pressure bulkhead is adapted to transmit pressure loads acting on the pressure bulkhead into the fuselage section and therefore into the fuselage, e.g. into a primary structure of an aircraft. The pressure bulkhead may comprise a pressure optimized spherical shape. However, it may be possible that the pressure loads are transferred into the fuselage section at the virtual intersection line which three-dimensionally extends on the inner surface of the fuselage section.

According to another embodiment of the invention, the pressure bulkhead comprises a shell-like structure in the form of a spherical dome.

In other words, the pressure bulkhead may have the shape of a spherical calotte or a spherical cap. However, the pressure bulkhead is adapted to effectively transmit pressure loads into the fuselage section. The pressure bulkhead may have a spherical shape, but a non-circular outer edge in a cross sectional view or in a front view.

According to yet another embodiment of the invention, the fuselage further comprises an attachment unit for attaching the pressure bulkhead to the inner surface of the fuselage section. Therein, the attachment unit is located in a region of the outer edge of the pressure bulkhead.

By means of the attachment unit, it is possible that the pressure loads acting on the pressure bulkhead, for example on a surface of the pressure bulkhead, may be effectively transmitted into the fuselage section. The pressure bulkhead may be attached to the inner surface of the fuselage section via the attachment unit such that the pressure bulkhead is not in direct contact the inner surface of the fuselage section. In particular, there may be a constant distance between the non-circular outer edge of the pressure bulkhead and the inner surface of the fuselage section along the intersection line or along the non-circular line. The distance therefore generates a gap between the outer edge of the pressure bulkhead and the inner surface of the fuselage section, which gap may be closed by at least a part of the attachment unit. In other words, the attachment unit may fill or bridge the gap which is defined by the constant distance and therefore connects the pressure bulkhead to the inner surface of the fuselage section. However, it is also possible that the outer edge of the pressure bulkhead is in direct contact to the inner surface of the fuselage section while the attachment unit provides a fixation of the pressure bulkhead within the fuselage section. In this case, the non-circular line may lie in the virtual intersection line.

According to another embodiment of the invention, the attachment unit comprises a profile, which extends along at least a part of a virtual intersection line and/or the non-circular line along which the outer edge of the spherical pressure bulkhead is attached to the inner surface of the fuselage section.

The virtual intersection line may be the intersection line as described above, e.g, the intersection line generated by an intersection of an extended inner surface of the pressure bulkhead and the inner surface of the fuselage section. The profile may be an elongated profile which follows or extends parallel to the virtual intersection line and/or the non-circular line defining the outer edge of the pressure bulkhead, for example at a predetermined distance. The profile may be adapted to attach the pressure bulkhead to the inner surface of the fuselage section. The fact that the profile only extends along at least a part of the line and/or virtual intersection line, facilitates the integration or the attachment of the profile to the fuselage. In other words, the pressure bulkhead may be attached to the inner surface of the fuselage section step by step which means that a plurality of profiles may be attached one after another. It should be mentioned that the attachment unit comprises a profile in a cross-sectional view. The profile extends along at least a part of the line and/or virtual intersection line means that the cross section of the profile remains constant when extruding along or into the direction of the virtual intersection line or the non-circular line.

According to another embodiment of the invention, the profile comprises a constant cross-section along the part of the virtual intersection line or the non-circular line describing the outer edge of the pressure bulkhead. The profile may also be a curved part because it extends along the three-dimensional intersection line.

For example, the profile has a constant width, a constant height, etc. In other words, the edges of the profile may have a constant distance from each other while the profile is extruded or extends along the part of the virtual intersection line.

According to another embodiment of the invention, the profile comprises an outer surface and an inner surface. The outer surface of the profile is attached to the inner surface of the fuselage section and to an inner surface of the pressure bulkhead.

For a person looking from inside the fuselage section, the intersection line may be covered by the profile such that the person looking from inside the fuselage section only sees the inner surface of the profile. This is due to the fact that the outer surface is attached to the pressure bulkhead and to the inner surface of the fuselage section. This also provides an easier access within the fuselage section when attaching the pressure bulkhead to the fuselage section. For example, the profile is attached to the pressure bulkhead and/or to the fuselage section by means of screws, bolts or rivets.

According to yet another embodiment of the invention, the profile comprises a first region and a second region adjacent to the first region both forming an obtuse angle α. Therein, the first region is attached to the pressure bulkhead and the second region is attached to the inner surface of the fuselage section.

For example, the profile comprises the form of an L-profile, wherein the flanges of the L-profile enclose an obtuse angle. The first region may be defined by the first flange and the second region may be defined by the second flange of the L-profile such that the first flange of the L-profile is attached to the pressure bulkhead and the second flange of the L-profile is attached to the inner surface of the fuselage section. This L-profile may extend along or parallel to the intersection line. The obtuse angle is a result of the fact that the spherical pressure bulkhead ends on the inner surface of the fuselage section under the obtuse angle α which requires the integration of the profile in the form of a connection angle connecting the pressure bulkhead to the inner surface of the fuselage section.

According to another embodiment of the invention, the fuselage further comprises a plurality of profiles, wherein each of the profiles extends along at least a part of the virtual intersection line or the non-circular line such that the plurality of profiles together form a frame which is aligned with the virtual intersection line.

In this manner, the pressure bulkhead may be attached to the inner surface of the fuselage section along the whole intersection line and therefore along the whole inner surface of the fuselage section, thus providing an effective means for transmitting the loads acting on the pressure bulkhead into the fuselage section. In other words, a frame is provided around the longitudinal axis of the fuselage section or the fuselage. The frame may be an extruded profile along and/or parallel to the intersection line and therefore also along and/or parallel to the inner surface of the fuselage section. The frame may further provide a stiffening of the fuselage section in a region of the intersection line. The usage of the plurality of profiles provides an easier integration of the attachment unit, e.g. the plurality of profiles may be integrated into the fuselage section step by step, in order to provide an attachment means for attaching the pressure bulkhead to the inner surface of the fuselage section. The plurality of profiles may therefore be attached to the pressure bulkhead in a region of the outer edge or the non circular line of the pressure bulkhead.

According to another embodiment of the invention, the pressure bulkhead is manufactured of a material selected from a group, the group comprising a composite material, a fiber composite material and a carbon fiber reinforced plastic.

Using composite materials, provides the opportunity to reduce weight of the pressure bulkhead which is important when using the pressure bulkhead for aircraft applications. The pressure bulkhead may be stiffened by stiffening units which may also be manufactured from a material selected from the group comprising a composite material, a fiber composite material and a carbon fiber-reinforced plastic. The pressure bulkhead, which may be a rear pressure bulkhead of an aircraft, is manufactured from one piece.

According to another embodiment of the invention, the pressure bulkhead comprises a spherical shape.

In particular, the pressure bulkhead may comprise a completely spherical shape. In this manner, pressure loads acting on the pressure bulkhead is effectively transmittable into the fuselage structure, for example into the fuselage structure of an aircraft.

According to an aspect of the present invention, an aircraft comprising a fuselage is provided. The fuselage may comprise the features as described above.

For example, the pressure bulkhead of the fuselage may be a rear pressure bulkhead of the aircraft which separates the pressurized cabin area and the non-pressurized outer area of the aircraft, e.g. of the fuselage of the aircraft.

According to another aspect of the present invention, a method for manufacturing a fuselage is provided. In a step of the method, a fuselage section with an inner surface having a non-circular contour is provided. In another step of the method, a spherical pressure bulkhead with an outer edge is provided. The outer edge of the spherical pressure bulkhead is attached to the inner surface of the fuselage section and extends along a line, which is non-circular. The line is a three-dimensional curve extending parallel to the inner surface of the fuselage section. The steps may comprise the features as described with reference to the fuselage above.

The method may comprise further steps, for example the step of providing a constant distance between an outer edge of the pressure bulkhead and the inner surface of the fuselage section. In another step, the pressure bulkhead may be attached to the inner surface of the fuselage section by means of an attachment unit which attachment unit comprises a profile extending along the outer edge or the virtual intersection line.

DETAILED DESCRIPTION

The items shown in the figures are not drawn to scale.

Figure 1:
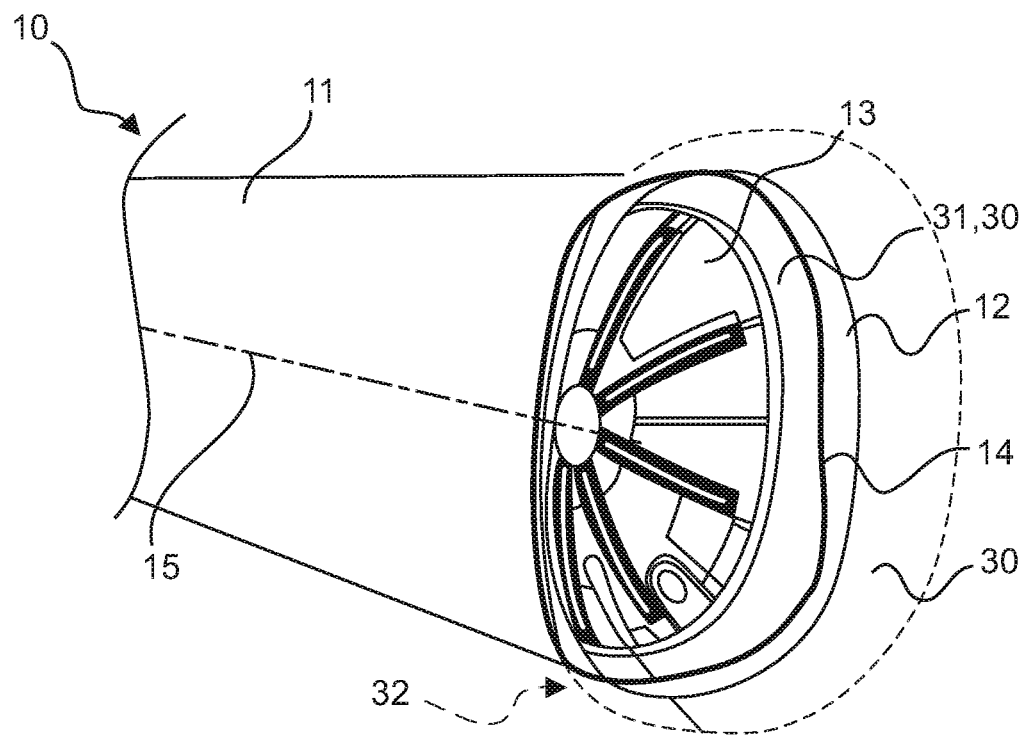
FIG. 1 shows a perspective view of an intersection of an inner surface of the fuselage section and a surface of a pressure bulkhead according to an embodiment of the invention.

FIG. 1 shows a fuselage 10 comprising a fuselage section 11 with an inner surface 12 having a non-circular contour with respect to a cross-sectional view of the fuselage section 11. The cross-sectional view may be based on a viewing direction which is parallel to a longitudinal axis 15 of the fuselage 10 or of the fuselage section 11. The fuselage 10 further comprises a pressure bulkhead 13 which may be a rear pressure bulkhead of an aircraft. The pressure bulkhead 13 may comprise an inner surface 31. The pressure bulkhead 13 may be integrated into the fuselage section 11 such that a virtual intersection line between a spherical surface 30 of the pressure bulkhead 13 and the inner surface 12 of the fuselage section is provided. The spherical surface 30 may be a virtual extension 32 of the inner surface 31 of the pressure bulkhead 13 which intersects the inner surface 12 of the fuselage section 11 and in this manner forms an intersection line 14 between the extended spherical surface 30 and the inner surface 12 of the fuselage section 11. The spherical surface 30 which extends the inner surface 31 of the pressure bulkhead may be a virtual spherical surface which corresponds to or lies in the inner surface 31 of the spherical pressure bulkhead. This virtual spherical surface 32, which is an extension of the inner surface 31 of the pressure bulkhead 13, intersects the inner surface 12 of the fuselage section 11 at the intersection line 14. The intersection line 14 may be a closed curve which is arranged around the longitudinal axis 15 of the fuselage section 11. The virtual intersection line 14 may be a curve extending on the inner surface 12 of the fuselage section 11 in a three-dimensional space. However, the pressure bulkhead 13 may extend to the intersection line 14 such that the pressure bulkhead 13 is in contact with the inner surface 12 of the fuselage section 11. However, the pressure bulkhead 13 may also extend to the intersection line 14 such that the pressure bulkhead 13 is not in direct contact to the inner surface 12 of the fuselage section 11. In particular, a gap between an outer edge of the pressure bulkhead 13 and the inner surface 12 of the fuselage section 11 is provided, wherein the gap comprises a constant distance and extends along the intersection line 14. In other words, the outer edge of the pressure bulkhead 13 and the virtual intersection line 14 are parallel curves with a predetermined offset which offset may be defined as the distance or gap between the outer edge 16 (FIG. 4) of the pressure bulkhead 13 and the inner surface 12 of the fuselage section 11.

Figure 2:
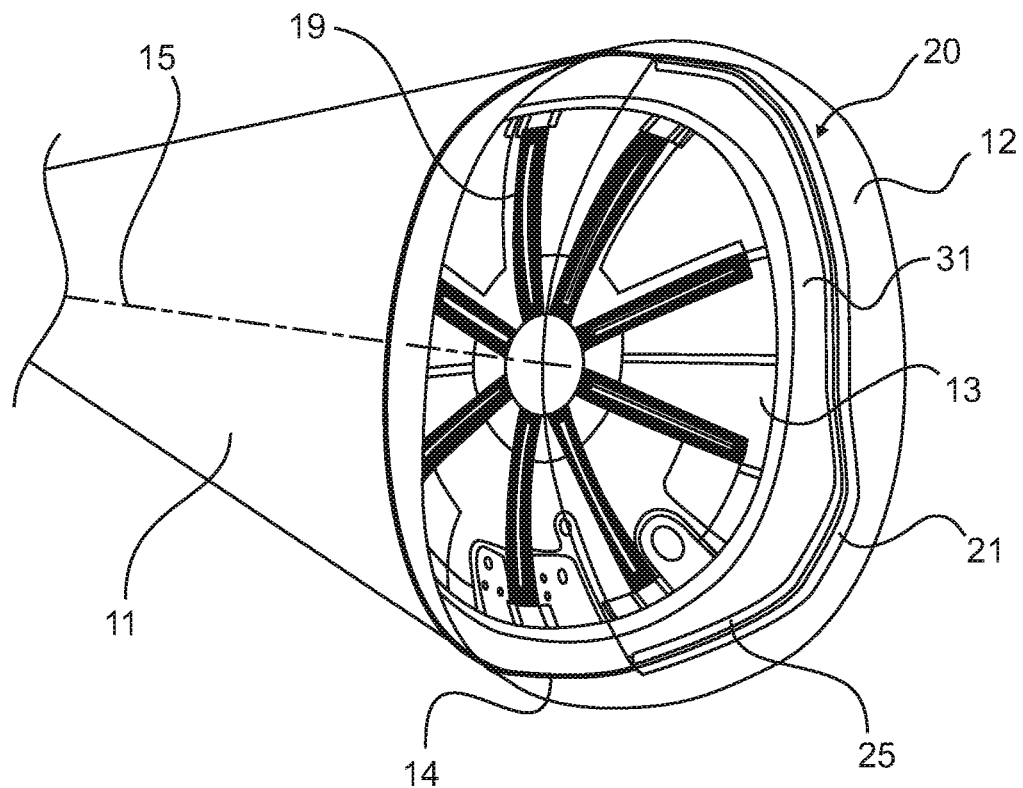
FIG. 2 shows a perspective view of a pressure bulkhead which is attached to an inner surface of the fuselage section by means of an attachment unit according to an embodiment of the invention.

FIG. 2 shows a perspective view of a fuselage section 11 and an integrated pressure bulkhead 13 which is attached to an inner surface 12 of the fuselage section 11. The pressure bulkhead 13 may be attached to the inner surface 12 by means of an attachment unit 20, which attachment unit 20 may comprise a profile 21 and/or other profiles 25. The profile 21 attaches the pressure bulkhead 13 to the inner surface 12 of the fuselage section 11 along the intersection line 14, which intersection line 14 is a virtual three-dimensional curve which is provided by an intersection between an extended inner surface 30 of the pressure bulkhead 13 and the inner surface 12 of the fuselage section 11 as shown in FIG. 1. Since the profile 21 extends along the intersection line 14, the profile 21 also extends on the inner surface 12 of the fuselage section 11. The attachment unit 20, e.g. the profile 21, attaches the pressure bulkhead 13 to the inner surface 12 of the fuselage section 11 such that a pressure equalization between the pressurized cabin area and a non-pressurized outer area of the fuselage section 11 is not possible. This is advantageous because the pressure bulkhead 13 is adapted to separate the pressurized cabin area from the non-pressurized outer area of the fuselage section 11. Therefore, the pressure bulkhead 13 is adapted to transmit pressure loads acting on an outer surface of the pressure bulkhead 13, which is not shown in FIG. 2, into the fuselage section 11. The pressure bulkhead 13 may therefore comprise stiffening units 19 having elongated shapes. The elongated stiffening units 19 may be radially arranged around the longitudinal axis 15 of the fuselage section 11. The pressure bulkhead 13 may thus be a shell-like structural component with an inner surface 31 on which the stiffening units 19 are located. For example, the pressure bulkhead 13 is manufactured from one piece which extends to the inner surface 12 of the fuselage section 11 such that no additional parts are necessary to fill a gap between an outer edge of the pressure bulkhead 11 and the inner surface 12 of the fuselage section 11. However, it is possible that a small gap with a constant thickness is located between the outer edge of the pressure bulkhead 13 and the inner surface 12 of the fuselage section 11. This gap is defined by a constant thickness which is measured perpendicularly to the inner surface 12 of the fuselage section 11 and indicates the distance between the outer edge of the pressure bulkhead 13 and the inner surface 12 of the fuselage section 11. This distance may be constant along the outer edge of the pressure bulkhead 13 and/or along the intersection line 14 which extends on the inner surface 12 of the fuselage section 11.

Figure 3:
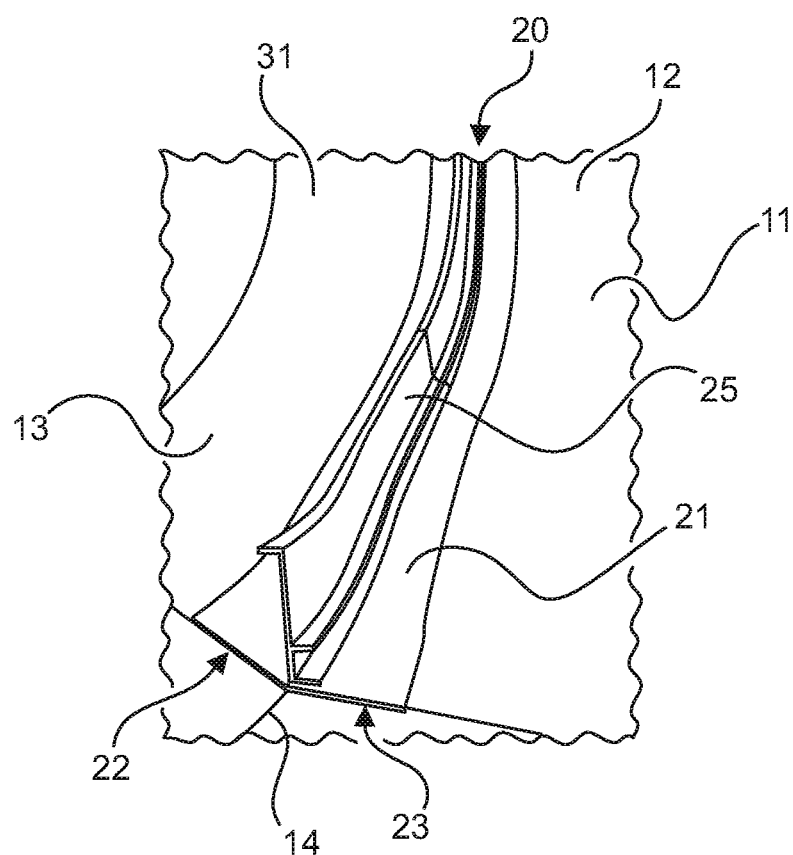
FIG. 3 shows a detailed view of an attachment unit for attaching a pressure bulkhead to an inner surface of a fuselage section according to an embodiment of the invention.

FIG. 3 shows a detailed view of an attachment unit 20 for attaching the pressure bulkhead 13 to the inner surface 12 of the fuselage section 11. The attachment unit 20 comprises a profile 21 which extends along the intersection line 14, which intersection line is a three-dimensional curve. The profile 21 comprises a first region 22 and a second region 23, wherein the first region 22 is attached to the inner surface 31 of the pressure bulkhead 13. The second region 23 of the profile 21 is attached to the inner surface 12 of the fuselage section 11. The profile 21 extends at least along a part of the intersection line 14. The attachment unit 20 may further comprise a second profile 25 which also extends along the intersection line 14 and/or the profile 21.

Figure 4:
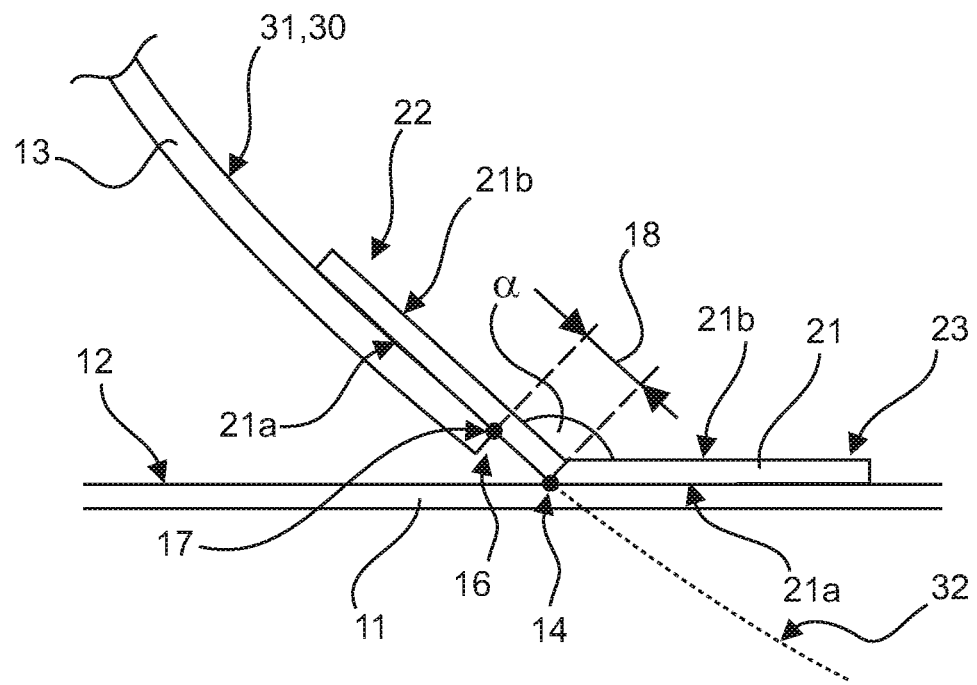
FIG. 4 shows a cross-sectional view of an attachment unit comprising a profile for attaching a pressure bulkhead to an inner surface of a fuselage section according to an embodiment of the invention.

FIG. 4 shows a cross-sectional view of the profile 21 and a part of the pressure bulkhead 13 as well as a part of the fuselage section 11. The first region 22 of the profile 21 is attached via an outer surface 21a of the profile 21 to the inner surface 31 of the pressure bulkhead 13. The profile 21 may further be attached to the fuselage section 11, in particular to the inner surface 12 of the fuselage section 11 by means of the outer surface 12a of the second region 23 of the profile 21. The profile 21 may be an L-profile, which L-profile comprises a first flange and a second flange wherein the first region 22 represents the first flange and the second region 23 represents the second flange. Both flanges of the profile 21 enclose an angle α. The angle α is substantially the angle under which the extended spherical surface 30 of the pressure bulkhead 13 intersects the inner surface 12 of the fuselage section 11. The extended spherical inner surface 30 of the pressure bulkhead 13, in particular the inner surface 31 of the pressure bulkhead 13, is indicated by a dashed line in FIG. 4. The intersection line 14 between the extended spherical inner surface 30 of the pressure bulkhead 13, which extended spherical inner surface 30 may be a virtual surface, and the inner surface 12 of the fuselage section 11 may be located on the inner surface 21 of the fuselage section 11. A non-circular line 17 along which the outer edge 16 of the pressure bulkhead 13 extends or is attached to the inner surface 12 of the fuselage section may have a constant distance to the intersection line 14. However, both lines 14, 17 may extend parallel to each other around the longitudinal axis 15 of the fuselage section 11.

The profile 12 may comprise an inner surface 21b such that for a person looking from inside the pressurized cabin area, the intersection line 14 is covered by the profile 21. However, an outer edge 16 of the pressure bulkhead 13 may have the distance 18 to the intersection line 14 which is constant along the intersection line 14 when extending along the inner surface 12 of the fuselage section 11. The intersection line 14 may be a three-dimensional line which extends around the longitudinal axis 15 of the fuselage section on the inner surface 12 of the fuselage section 11. The profile 21 may be attached to the fuselage section 11 by means of the second region 23 and by providing rivets, bolts or screw joints. Analogously, the second region 22 of the profile 21 may be attached to the pressure bulkhead 13 by means of rivets, bolts or screw joints. The connecting means like for example rivets, screws or bolts are not shown in FIG. 4. The outer edge 16 of the pressure bulkhead 13 may describe a line or curve which extends along the intersection line 14 at the predetermined distance 18 and therefore is a parallel curve to the intersection line 14. The offset between the line or curve describing the outer edge 16 of the pressure bulkhead 13 may be an offset curve with respect to the intersection line 14 extending along the outer edge 16 of the pressure bulkhead 13.

Figure 5:
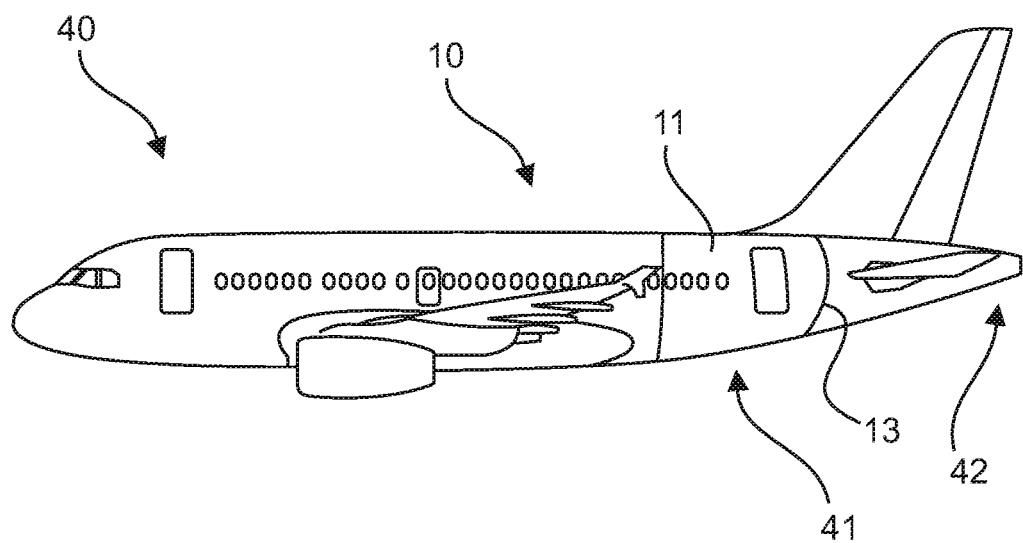
FIG. 5 shows an aircraft with a fuselage section and a pressure bulkhead according to an embodiment of the invention.

FIG. 5 shows an aircraft 40 with a fuselage 10, wherein the fuselage 10 comprises a fuselage section 11 and the pressure bulkhead 13. The pressure bulkhead 13 is adapted to separate a pressurized cabin area 41 and a non-pressurized outer area 42 of the aircraft 40. Therefore, the pressure bulkhead 13 and/or the attachment unit 20 may further comprise sealings such that a pressure equalization between the pressurized area 41 and the non-pressurized area 42 through the pressure bulkhead may be prevented.

Figure 6:
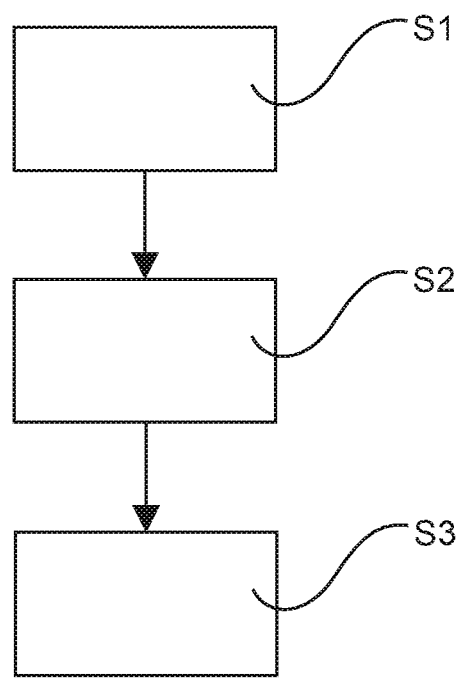
FIG. 6 shows a flow diagram of a method for manufacturing a fuselage according to an embodiment of the invention.

FIG. 6 shows a flow diagram of a method for manufacturing a fuselage. In a step S1 of the method, a fuselage section 11 with an inner surface 12 having a non-circular contour is provided. In another step S2, a spherical pressure bulkhead 13 with an outer edge 16 is provided. In a step S3, the outer edge 16 of the spherical pressure bulkhead 13 is attached to the inner surface 12 of the fuselage section 11 and extends along a line, which is non-circular. The line 17 is a three-dimensional curve extending parallel to the inner surface 12 of the fuselage section 11.

While the invention has been illustrated and described in detail in the drawings and the foregoing description, such illustration and description are to be considered illustrative and exemplary and not restrictive; the invention is not limited to the disclosed embodiments. Other variations to the disclosed embodiments may be understood and effected by those skilled in the art and practicing the claimed invention, from a study of the drawings, the disclosure, and the appended clams. In the claims the term "comprising" does not exclude other elements, and the indefinite article "a" or "an" does not exclude a plurality. The mere fact that certain measures are recited in mutually different dependant claims does not indicate that a combination of these measures cannot be used to advantage. Any reference signs in the claims should not be construed as limiting the scope of protection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage comprising:
   a fuselage section with an inner surface having a non-circular contour; and
   a pressure bulkhead with an outer edge, an inner surface, and a plurality of stiffening units having elongated shapes arranged on the inner surface;
   wherein the outer edge of the pressure bulkhead is attached to the inner surface of the fuselage section and extends along a line, wherein the line is non-circular and non-planar; and
   wherein the line extends in a three-dimensional space extending parallel to the inner surface of the fuselage section.

2. The fuselage according to claim 1, wherein the line forms a closed curve enclosing a longitudinal axis of the fuselage section.

3. The fuselage according to claim 1, wherein the pressure bulkhead forms a barrier between a pressurized cabin area and a non-pressurized outer area of the fuselage section.

4. The fuselage according to claim 1, wherein the pressure bulkhead comprises a structure in the form of a dome.

5. The fuselage according to claim 1, further comprising:
   an attachment unit for attaching the outer edge of the pressure bulkhead to the inner surface of the fuselage section;
   wherein the attachment unit is located in a region of the outer edge of the pressure bulkhead.

6. The fuselage according to claim 5, wherein the attachment unit comprises a profile extending along at least a part of at least one of a virtual intersection line and the non-circular line along which the outer edge of the pressure bulkhead is attached to the inner surface of the fuselage section.

7. The fuselage according to claim 6, wherein the profile comprises a constant cross section along the part of at least one of the virtual intersection line and the non-circular line.

8. The fuselage according to claim 6,
   wherein the profile comprises an outer surface and an inner surface,
   wherein the outer surface of the profile is attached to the inner surface of the fuselage section and to an inner surface of the pressure bulkhead.

9. The fuselage according to claim 6,
   wherein the profile comprises a first region and a second region adjacent to the first region, both forming an obtuse angle α,
   wherein the first region is attached to the pressure bulkhead and the second region is attached to the inner surface of the fuselage section.

10. The fuselage according to claim 5, further comprising:
    a plurality of profiles,
    wherein each of the plurality of profiles extends along a part of at least one of a virtual intersection line and the non-circular line such that the plurality of profiles together forms a frame aligned with at least one of the virtual intersection line and the non-circular line.

11. The fuselage according to claim 1, wherein the pressure bulkhead is manufactured of a material selected from a group consisting of a composite material, a fiber composite material and a carbon fiber-reinforced plastic.

12. The fuselage according to claim 1, wherein the pressure bulkhead comprises a semispherical shape.

13. An aircraft, comprising a fuselage comprising:
    a fuselage section with an inner surface having a non-circular contour; and
    a pressure bulkhead with an outer edge, an inner surface, and a plurality of stiffening units having elongated shapes arranged on the inner surface;
    wherein the outer edge of the pressure bulkhead is attached to the inner surface of the fuselage section and extends along a line, wherein the line is non-circular and non-planar; and
    wherein the line extends in a three-dimensional space extending parallel to the inner surface of the fuselage section.

14. A method for manufacturing a fuselage, the method comprising:
    providing a fuselage section with an inner surface having a non-circular contour;
    providing a pressure bulkhead with an outer edge, an inner surface, and a plurality of stiffening units having elongated shapes arranged on the inner surface; and
    attaching the outer edge of the pressure bulkhead to the inner surface of the fuselage section, the outer edge extending along a line, wherein the line is non-circular and non-planar,
    wherein the line extends in a three-dimensional space extending parallel to the inner surface of the fuselage section.

* * * * *